United States Patent
McGavran et al.

(10) Patent No.: US 12,001,459 B2
(45) Date of Patent: *Jun. 4, 2024

(54) TOPOLOGICAL BASEMODEL SUPPORTING IMPROVED CONFLATION AND STABLE FEATURE IDENTITY

(71) Applicant: Google LLC, Mountain View, CA (US)

(72) Inventors: Christine McGavran, Pacifica, CA (US); Richard William Bukowski, Palo Alto, CA (US); Bryan Klingner, Austin, TX (US); Joakim Kristian Olle Arfvidsson, Los Altos, CA (US); Andrew Lookingbill, Palo Alto, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/091,953

(22) Filed: Dec. 30, 2022

(65) Prior Publication Data
US 2023/0132820 A1    May 4, 2023

Related U.S. Application Data

(63) Continuation of application No. 17/251,071, filed as application No. PCT/US2020/020618 on Mar. 2, 2020, now Pat. No. 11,544,299.

(51) Int. Cl.
*G06F 16/00* (2019.01)
*G06F 16/22* (2019.01)
*G06F 16/29* (2019.01)

(52) U.S. Cl.
CPC .......... *G06F 16/29* (2019.01); *G06F 16/2272* (2019.01)

(58) Field of Classification Search
None
See application file for complete search history.

(56) References Cited

U.S. PATENT DOCUMENTS

| 6,128,577 | A | 10/2000 | Assa et al. |
| 7,689,621 | B1 * | 3/2010 | Huber .............. G06F 16/29 |
| | | | 707/743 |

(Continued)

FOREIGN PATENT DOCUMENTS

| EP | 3048421 A2 * | 7/2016 | ........... G01C 21/32 |
| WO | WO 2018/218149 | 11/2018 | |
| WO | WO-2022076408 A1 * | 4/2022 | ......... G01C 21/3878 |

OTHER PUBLICATIONS

International Search Report for PCT/US2020/020618, dated Nov. 24, 2020, 5 pages.

(Continued)

*Primary Examiner* — Jean M Corrielus
(74) *Attorney, Agent, or Firm* — DORITY & MANNING P.A.

(57) ABSTRACT

The present disclosure is directed to systems and methods for providing a stable topological representation of pathway networks as well as features associated with these networks. The disclosure is exemplified using road networks which have applications in mapping, navigation, and autonomous vehicles. Extensions may be learned through practice of the disclosure. Utilizing implementations disclosed herein may provide advantages for data conflation between different mapping systems and map data while improving overall stability by developing a common reference standard that is tied to semantic features rather than abstract geographic representations.

20 Claims, 9 Drawing Sheets

(56) References Cited

U.S. PATENT DOCUMENTS

| | | | |
|---|---|---|---|
| 7,925,982 B2 | 4/2011 | Parker et al. | |
| 8,358,819 B2 | 1/2013 | Wu et al. | |
| 8,510,268 B1* | 8/2013 | LaForge | G01C 21/3856 |
| | | | 705/344 |
| 8,571,278 B2 | 10/2013 | Sonka et al. | |
| 9,020,986 B1* | 4/2015 | Pilloff | G01C 21/3867 |
| | | | 707/812 |
| 9,753,950 B2 | 9/2017 | Schultz et al. | |
| 10,241,963 B2* | 3/2019 | Ioup | G06F 16/29 |
| 11,308,673 B2 | 4/2022 | Comer | |
| 2004/0249686 A1 | 12/2004 | Murphy | |
| 2005/0193003 A1* | 9/2005 | Popovici | G06F 16/29 |
| 2006/0287815 A1* | 12/2006 | Gluck | G01C 21/3667 |
| | | | 340/995.1 |
| 2007/0106455 A1* | 5/2007 | Fuchs | G06F 16/29 |
| | | | 701/438 |
| 2007/0260628 A1 | 11/2007 | Fuchs et al. | |
| 2008/0051989 A1 | 2/2008 | Welsh | |
| 2008/0162467 A1* | 7/2008 | Fuchs | G06F 16/29 |
| | | | 707/999.005 |
| 2008/0168090 A1* | 7/2008 | Fuchs | G06F 16/29 |
| 2008/0228392 A1* | 9/2008 | Fuchs | G06F 16/29 |
| | | | 701/532 |
| 2010/0057407 A1* | 3/2010 | Fitt | G06F 16/29 |
| | | | 707/E17.014 |
| 2010/0076928 A1* | 3/2010 | Luedtke | G01C 21/3878 |
| | | | 707/E17.005 |
| 2013/0018883 A1* | 1/2013 | Park | G06F 16/29 |
| | | | 707/736 |
| 2013/0328941 A1* | 12/2013 | Carbonneau | G06T 11/00 |
| | | | 345/667 |
| 2014/0280269 A1 | 9/2014 | Schultz et al. | |
| 2016/0298982 A1* | 10/2016 | Bailiang | G06F 16/29 |
| 2017/0039258 A1* | 2/2017 | Shah | G06F 16/258 |
| 2017/0108347 A1* | 4/2017 | Zhu | G01C 21/3881 |
| 2021/0012549 A1 | 1/2021 | Comer et al. | |
| 2022/0215045 A1* | 7/2022 | Tiu | G01C 21/3841 |

OTHER PUBLICATIONS

International Preliminary Report on Patentability for Application No. PCT/US2020/020618, dated Sep. 15, 2022, 13 pages.

* cited by examiner

TOPOLOGICAL BASEMODEL SUPPORTING IMPROVED CONFLATION AND STABLE FEATURE IDENTITY

PRIORITY CLAIM

The present application is a continuation of U.S. application Ser. No. 17/251,071 having a filing date of Dec. 10, 2020, which claims the right of priority under 35 U.S.C. § 371 to International Application No. PCT/US2020/020618 filed on Mar. 2, 2020. Applicant claims priority to and the benefit of each of such applications and incorporate all such applications herein by reference in their entirety.

FIELD

The present disclosure relates generally to mapping data and conflation. More particularly, the present disclosure relates to computer-implemented systems and methods which can provide improved stability for mapping applications and corresponding data and an improved ability to conflate and/or relate features from previously unrelated geographic datasets.

BACKGROUND

Mapping or indexing the world is an unbounded problem, with enormous types and levels of detail of information that are regularly changing and with many different possible ways of partitioning the world into distinct features. This problem is particularly challenging for roads or other networks, which can extend for many miles and may be subdivided in many possible ways. As such, it is highly impractical to create and maintain a single map that incorporates all needed data for all possible use cases.

In view of this problem, many different types and forms of maps have been created to handle different data types or use cases. However, these different maps are typically disparate and not directly relatable to each other. Specifically, even a given pair of maps which represent the same geographic area may have certain elements (e.g., roadways, points of interest, etc.) shown at different geographic locations and/or may not have a shared frame of reference for cross referencing such elements. Thus, techniques for improving the ability to combine and/or jointly interpret maps are needed in the art.

SUMMARY

The present disclosure is directed to systems and methods for providing a stable topological representation of pathway networks as well as features associated with these networks. The disclosure is exemplified using road networks which have applications in mapping, navigation, and autonomous vehicles. Extensions may be learned through practice of the disclosure. Utilizing implementations disclosed herein may provide advantages for data conflation between different mapping systems and map data while improving overall stability by developing a common reference standard that is tied to semantic features rather than abstract geographic representations.

BRIEF DESCRIPTION OF THE DRAWINGS

Detailed discussion of embodiments directed to one of ordinary skill in the art is set forth in the specification, which makes reference to the appended figures, in which:

In FIG. 5A the topological basemodel is shown including graph attributes as well as more complex properties such as road geometry and buildings. In FIG. 5B, a more detailed representation of the road network is shown which includes additional road segments (illustrated as lines extending from a circle) that can be conflated with the basemodel. In FIGS. 5C-5D, details of buildings such as entry points (5C) or access points to roads (5D) are illustrated to represent additional map features that may be conflated with the basemodel or associated in one or more property layers.

In FIG. 6, the topological model is displayed showing one or more edges, nodes, and/or anchors in accordance with example embodiments of the disclosure. Further layers may be associated with the topology that can be used to represent a physical description such as road geometry (e.g., width), a semantic description (e.g., street name), or other detail layers (e.g., road segments, intersections, traffic direction, etc.)

Figure 1:
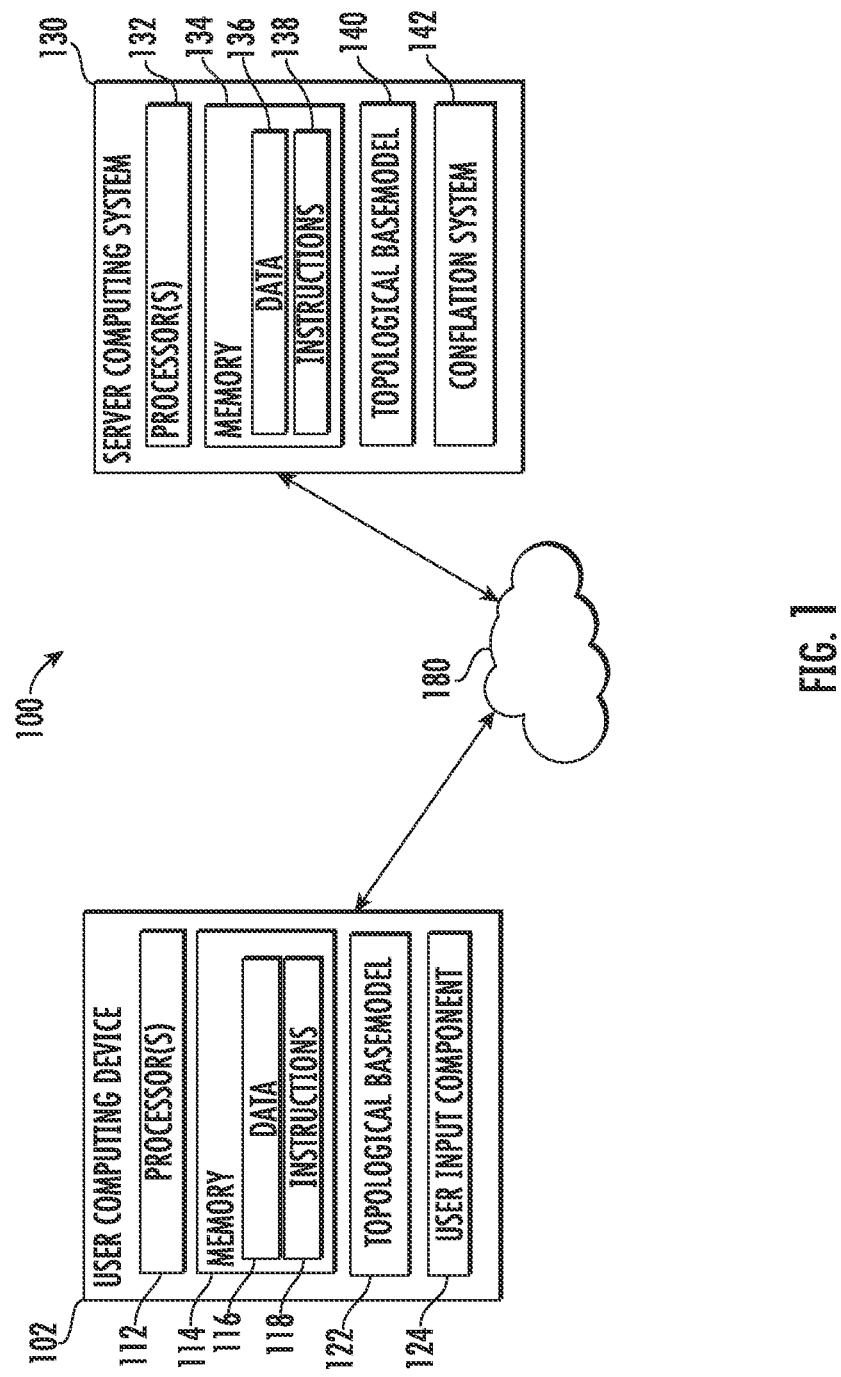
FIG. 1 illustrates an example computing system including a topological basemodel in accordance with the present disclosure.

Reference numerals that are repeated across plural figures are intended to identify the same features in various implementations.

DETAILED DESCRIPTION

Overview

In general, the present disclosure is directed to systems and methods that include and use a topological basemodel that includes a plurality of stable identifiers respectively for a plurality of semantic features or elements included in a geographic area. The identifiers are kept stable over time.

Additional aspects of the present disclosure are directed to methods that can create and/or update the topological basemodel (also referred to herein as a "basemodel").

In particular, the basemodel can include information that supports cohesive relative association of one or more various distinct map layers. Specifically, in one example, the basemodel can provide a plurality of stable identifiers respectively for a plurality of canonical elements (e.g., which can be represented using edges and vertices) that correspond to a plurality of semantic features (e.g., real-world items recognizable/perceivable by humans such as roads, intersections, buildings, etc.) included in a geographic area. This stable index of semantic features can be used to underlie or interrelate information from a variety of different maps, map layers, or mapping applications. Specifically, the basemodel can provide a common substrate and in some implementations a common geographic datum (e.g., world representation) on which one or more specific maps or applications can agree about basic identification and common principles, facilitating shared views and links between these maps and applications.

Thus, aspects of the basemodel (e.g., the stable identifiers) can be used to improve correspondence between different maps (or map layers) or mapping applications. Specifically, in one example, a first geographic dataset (e.g., map layer) can include features and a set of references which associate the features with certain stable identifiers included in the basemodel. By leveraging such references, the features of the first geographic dataset can be linked to certain defined semantic features, even as the first geographic dataset changes over time. In another example, two different geographic datasets can each have respective references to the stable identifiers of the basemodel. By identifying a shared reference to the same stable identifier, two features respectively included in the two different maps or map layers can be determined to correspond to each other (and to the same semantic feature), even if the two different maps or map layers have significantly different means by which they represent physical space and, absent the shared basemodel, would not otherwise be relatable.

This improved correspondence among maps or other geographic datasets can provide an advantage for users by intuitively mapping paths such as roads for applications such as location-aware guidance or other applications using location information. Additionally, the basemodel can be readily correlated to other mapping data through certain conflation operations that may provide improved accuracy and stability for incorporating new data into the basemodel or transmitting topological information to external applications.

More particularly, there are many commercial and non-commercial semantic maps available in the industry which have common properties and patterns. Most of these maps have at their basis a set of commonly used canonical features, such as roads or buildings. Some maps may also additionally include features that themselves are not common but relate in some way to the common features (e.g., an entrance to a building is 30 feet east of a certain well-known intersection). The features included in these maps usually have some sort of identifier ("ID") allowing lookup. However, these IDs are generally not stable (particularly for roads). Stated differently, for a particular map, feature IDs may change frequently from release to release of map data, even if the underlying feature hasn't changed in the real-world. Also, different maps typically have different IDs for the same feature, making it impossible to compare features by ID.

Instead, to enable joint interpretation or use of two maps, certain existing systems may seek to conflate features according to their description, which is a difficult problem that frequently fails to resolve to the same feature and which may result in the incorrect positioning of features. Furthermore, pure geometric conflation can produce serious errors given possible geometric or geographic disparities between different maps.

The present disclosure resolves these issues by providing an improved mechanism for identifying the core/basis features of datasets and relating those to each other via references to shared stable identifiers included in a basemodel. These references and the underlying stable identifiers then provide a basis for the features of types that are not in common to be related to each other through the common features. As an example, a first map may include roads and building access point data and a second map may include roads and sidewalks. By leveraging references to one or more stable identifiers included in the basemodel, a relationship can be determined to link the sidewalks to the access points via a common pathway network such as the roads. In this manner, relations between different features can be identified by going through core, shared features. Thus, by mapping a dataset to a common representation such as a topological basemodel two or more disparate topologies can be linked by producing a mapping indicative of relative position rather than exact position.

Another issue resolved by the present disclosure is the changing nature of geographic datasets (e.g., maps) as they change over time. In particular, users of maps often need to rely on the IDs of the maps to use those maps, for instance to compactly share or send references from a client to a server, or between two services. If IDs change or are inconsistent this complicates use. Sometimes this makes it difficult to upgrade maps over time (e.g., limiting map freshness). Alternatively this can restrict reliability of communication, for instance leading to inconsistencies following conflation, or preventing different applications from sharing detailed information about a map.

Aspects of the present disclosure resolve this problem by providing a common basemodel that ensures stable and reliable identifiers of map features that are also kept updated over time. The basemodel can be openly published for access by various applications, users, and/or the like. Furthermore, a service can be provided for accessing and interpreting the basemodel data. For example, the service can respond to calls for data according to a stable application programming interface ("API"). Thus, other maps can refer to their features via basemodel IDs or the common schema/language describing relative layered information over basemodel. Such an accessible and serviced basemodel can facilitate an ecosystem that encourages better sharing of topological information.

Use of a common topological basemodel in accordance with aspects of the present disclosure can allow for interoperability between different map systems and databases. Different geographic datasets may be conflated using the topological basemodel, with at least part of the conflated data being output to a client device, for example in response to a request from the client device for map data. As such, the client device may be able to efficiently receive and utilize information from a number of different geographic datasets. The use of a topological basemodel in accordance with aspects of the present disclosure may allow for reductions in the transmission of data, such as between a client requesting map data and a server providing the requested data, or a client providing updated map data to a server. For example, requesting and receiving data from a server using a common topological basemodel may require reduced amounts of data to be transmitted between the server and client when compared to the transmission of pure coordinate based data.

More particularly, one example aspect of the present disclosure includes a topological road network model (e.g., a graph) which can be used to represent physical paths (e.g., road networks) using relative relationships rather than coordinates (e.g., rather than geocodes such as specific latitude and longitude information). Such a system can include some or all of the following elements. Abstracted linear paths of travel, which can be directional (e.g., having a front end and a back end) and so may define two directions of travel, forward (towards a front end) and backward (towards a back end). Additionally, joint points can be defined where a traveler moving along one path may switch to another path at some point coexistent on each path. Using these building blocks, a routable network can be constructed where any path from one point on one edge to another point on another edge can be expressed as a sequence of edge joins.

Such a model leverages a semantic (e.g., rather than solely geographic) description of the world, which can be more attuned to human understanding of our world. Additionally, the model can be more resilient to identifying and/or resolving disagreements on the precise geographic location as well as properties related to some or all of the referenced features. In such a representation, the network need not express physical values such as specific distances or geocodes for elements along the route of travel. However, these additional properties may be linked or otherwise associated with the network using layers that may store such information and/or may be obtained by conflating the road network model with external datasets including such information. For instance, in some implementations, the base layer or a properties layer may include features such as buildings that can be represented as geometric parcels. The geometric parcels may encompass one or more joint points that can be used to represent a building front or other region along the network.

Generally, a topological model can be developed which partitions the network into layers that capture the essence of the topology such that the structure of the graph, structure of routes on the graph, and the conflation of two graphs at one layer are performed as independently as possible to disagreements in the attributes of the graph at higher layers. Thus, a robust topological representation in accordance with the disclosure can define such representations as a hierarchy which uses a denormalized representation at the lowest or "base" layer level to minimize disagreement that may arise from conflating map representations that can be geocoordinate, or image based.

As an example for illustration, an example topological model can include a layered hierarchy having a basemodel which defines a representation that substantially translates to a graph defined by edges, nodes, and anchors. Though not limited to specific representations, in one use case, edges may represent roads, vertices can represent ends of edges, and anchors (not necessarily to be confused with terminal vertices) can represent points of interest that either terminate roads or mark joints (e.g., intersections) or interesting places on roads (e.g., building fronts). Thus as used herein, the notion of location of an anchor is not a (x, y) position in space, but an identity capturing which edge(s) it is on, and, in some cases, where parametrically the anchor is on that edge with respect to any other anchors that reference that edge. Using this representation allows for vertices to implicitly be included as anchors; however, not all anchors are vertices as an anchor may include (e.g., be referenced by) multiple edges simultaneously.

Graph representations are well understood in computer science and can be used to align and conflate other data representations. Each of the graph elements (e.g., edges, nodes, and anchors) can be associated with a unique and stable ID that can be accessed/referenced by elements in other layers. However, typically, graph elements cannot access or reference attributes in other layers. Thus the layered model can be considered as providing elemental cross-referencing that occurs via shared reference to the stable IDs contained in the basemodel. Detail layers such as a semantic description (e.g., road names), a physical description (e.g., geometry), or other details (e.g., road segments) may be cross referenced by identifying the stable ID in the common basemodel dataset.

Using a basemodel allows the representation of the path network at varying levels that can include a denormalized representation (e.g., a denormalized graph), in the sense that an intersection may not explicitly join two edges, but the join may be through an edge terminating in an anchor which itself references the other adjoining edge. This denormalized form can be deterministically and mechanically normalized into a unique form by converting all anchors into traditional graph vertices by cutting all edges that are referenced by the anchor. This procedure can be used to convert anchors into vertices and gives the graph the classical normalized form, which can be used in some implementations for conflating the basemodel with other datasets.

Aspects of conflating the basemodel to physical data such as another graph or a dataset representing a physical area can include adding a physical projection. For example, a physical projection can include determining the relative locations of join points that share the same edge by defining a directionality (e.g., that one join point is forward of, or behind, the other join point on a particular edge). This makes directions more specific: "From join A, move forward on the red edge passing join B to arrive at join C, then move backward on the blue edge to join D". Qualitatively, moving forward and/or backward to get to the next join captures the essence of motion without restricting the location or order of joins on an edge (which can be used to correct for differences in physical properties). As another example, join points can be defined using parametric locations on the edges they join. The most common of these is simply pinning the join points to the front or back ends of the corresponding edge. An edge can be considered to have a front and back, which can be defined in a number of ways such as from 0.0 at the back point to 1.0 on the front point. Specific coordinates can be determined for the join point in terms of fraction along the edge. While specific coordinates can be defined in the model space, this still does not force a specific position in physical space, since the edge itself has no physical form yet. As still another example, physical form (e.g., curvature) can be assigned to the edges themselves, by mapping each parametric coordinate on the edge from 0.0 to 1.0 to a point or patch of area in a physical model.

For conflation to physical identities a requirement can optionally be included in the conflation process such that each piece of real-world road driving area may be a part of zero or one edges in the graph. Note that this means that an edge in the graph may represent multiple physical "roads" depending on how the roads are partitioned by a particular skeletonization of physical driving area, but a particular bit of ground may only be represented by one edge. Alternatively, a single "road" may be represented using multiple edges (e.g., two edges correspond to two lanes of traffic on the road that travel in opposite directions; four edges correspond to four lanes of traffic; etc.)

In general, the topological graph that underlies the basemodel comprises an edge and anchor graph. Each entity includes a stable ID where stability indicates that the ID for such feature is permanently unchanging over time. However, due to the changing nature of the physical world, a notion of time change can be included in certain models. For instance, the graph or the data underlying the graph may be referenced to a snapshot that is associated with a time (t). Any change in properties such as connectivity, set of anchoring edges, etc. can then result in optionally assigning new and unique IDs that effectively create a new identity. For example, different epochs of basemodels can be created, where each epoch has a set of stable and unchanging feature IDs. A mapping between the stable IDs of each pair of epochs can also be maintained for projection between epochs.

Certain operations can be defined for updating the basemodel that are in line with the stable ID features described above. These operations can be segmented as pertaining to the edge, the anchor, or in some implementations both.

For instance, adding an edge can include defining how the edge connects to other edges. Simply adding the edge itself can be accomplished by creating a new ID to the database at the current database time, to establish the new identity. Connections to existing edges can then be made by adding anchors that relate the new edge to existing edges. Relations to other anchors can be considered implicit. One example of a type of linkage can include: the new edge attaches to some other edge at an end. In this case, the system can create a new anchor which references both the old edge ID and the new edge ID, each of which at the appropriate end. Another example can include: the new edge attaches to the other edge in the middle. This does the same thing except the anchor association with the new edge is "unspecified" and not an end.

Some example implementations of the present disclosure support the storage of the graph in a denormalized form. If the basemodel were to use a normalized map, only one such anchor would be needed, and the old anchor could be deleted, and a new anchor created by union of the attachments of the old and new anchors. Since implementations can include denormalized forms, the existing anchors can be unmodified or one or more existing anchors can be added to the reference set of the new anchor if the anchor is intended topologically as the same connection point.

Additional edge level changes can include deleting an edge and merging edges. For instance, deleting can include updating the graph to set a time (e.g., a death time). Merging two edges in a denormalized graph can be segmented into a complete merge (i.e., the result of merging is the edges are fully the same) or incomplete (i.e., there is both a joint region where the edges are the same, and a disjoint region where each ID for the two edges refers to some additional path or surface not referenced by the other). As an example, a complete merge can be handled as either a one-into-the other, where one ID is forwarded to the other, or a replacement, where both are replaced with a newly born edge ID. Generally, this merge should preserve directionality, so the merge is either a forward (matching directions) or reverse (disjoint directions) merge. In another example, an incomplete merge can be handled by combining a complete merge as above using the one-into-the-other method with the additional birth of up to two new edge IDs corresponding to the front or back remainders of the dying source edge.

Anchor level changes to the basemodel have been discussed to some degree with respect to adding an edge, splitting, or merging an edge. For instance, an anchor intrinsically represents a join so adding a new anchor can include naming the edges (e.g., the IDs associated with the edges) and/or anchors (e.g., the IDs associated with the anchors) being joined.

Aspects of the disclosure may be represented in various forms. For example, a computing system including memory for constructing a relational or hierarchical database may be used to store the basemodel. The computing system may also include memory or hardware including instructions for performing updates to the basemodel and/or for conflating the basemodel with other mapping information. In some implementations, the computing system may be hosted on a server or in a distributed computing system having cloud connectivity. This distributed computing system can provide advantages for data storage and access to improve speed, stability, and reliability of data underlying the basemodel.

An example implementation of the disclosure can include a computing system having: one or more processors and one or more non-transitory computer-readable media (CRM) that collectively store data and instructions. Generally, the data includes a shared topological basemodel that comprises a plurality of stable identifiers respectively for a plurality of canonical edges and vertices that correspond to semantic features included in a geographic area. The CRM can also include instructions for performing one or more operations that, when executed by one or more processors, cause the system to perform operations.

The shared basemodel can be used to conflate at least a portion of two different geographic datasets. In particular, the conflation process can include: obtaining a first geographic dataset comprising a plurality of first edges and first vertices that respectively correspond to the plurality of semantic features and at least a first anchor that corresponds to a particular real-world item. In general, the first anchor is stored as having a location defined relative to a particular first edge or a particular first vertex of the plurality of first edges and first vertices. For instance, a database can be defined to have the anchor defined as related/referenced to one or more edges. Another operation can include, obtaining a second geographic dataset comprising a plurality of second edges and second vertices that respectively correspond to the plurality of semantic features. Stable identifiers (IDs) can then be identified from each of the geographic datasets, the IDs associated with a particular edge or vertex. From at least these operations, a second anchor can be generated in the second geographic dataset based on the particular second edge or the particular second vertex.

In certain implementations, the data including the topological basemodel can also include at least one property layer. An example aspect of the property layer can include attributes that are indexed to one of the anchors, one of the vertices, one of the edges, or a combination of any of these. Example properties can include descriptions (e.g., road name), geometry (e.g., road width, curvature, intersection type, etc.), buildings, coordinates, or other information. Another aspect of the property layer can include a hierarchy. For instance, a property layer can be defined as only able to reference property layers below it and not property layers above. In general, the graph comprising edges, nodes, and anchors is considered the lowest level of the hierarchy which can provide advantages in maintenance and ID stability.

For some implementations, the attributes included in property layers can be used to support one or more conflation operations. For example, identifying the particular second edge or the particular second vertex of the plurality of second edges and second vertices can include: obtaining one or more descriptors included in the second geographic dataset, comparing the one or more descriptors to at least one of the attributes included the property layer, determining, based at least in part on the comparison, a closest attribute; and determining, the anchor, vertex, or both to which the closest attribute is indexed. Thus in general, conflation operations may include searching for similarities between the basemodel and the second dataset. Since external datasets may not include the same denormalized reference, property layers can provide physical information such as street names, coordinates or other information that can be compared to the external reference. After identifying a matching or close correspondence between the basemodel and the second dataset, the attribute in the property layer can be used to look up the anchor, vertex, or both to which the closest attribute is indexed. In some implementations, the anchor, vertex, or both to which the closest attribute is indexed can then be used to map at least a portion of the second dataset by projecting the denormalized basemodel graph or a normalized form of the basemodel graph on the second dataset. For example, an anchor can be added to the second dataset corresponding to the descriptor location. Anchor information such as related edges and/or attributes from other layers can then be inherited from the basemodel.

With reference now to the Figures, example embodiments of the present disclosure will be discussed in further detail.

Example Devices and Systems

FIG. 1 depicts a block diagram of an example computing system 100 that can store or transmit information such as a topological basemodel 122 or 140 and/or a conflation system 142 according to example aspects of the present disclosure. In one example implementation, the system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include a topological basemodel 122.

In some implementations, the topological basemodel 122 can be received from the server computing system 130 over network 180, stored in the user computing device memory 114, and then used or otherwise implemented by the one or more processors 112. In some implementations, the user computing device 102 can implement multiple parallel instances of a single topological basemodel 122 (e.g., to perform parallel conflation operations between different sets of map data).

More particularly, the topological basemodel 122 can provide a stable reference for storing and/or indexing map features such as roads, buildings, that can be represented as a network (e.g., a graph). The topological basemodel 122 can be segmented into one or more layers that can each be individually accessed and/or downloaded depending on the application or use case.

Additionally or alternatively, a topological basemodel 140 or one or more features of the topological basemodel such as the basemodel topology or one or more detail layers can be included in or otherwise stored and implemented by the server computing system 130 that communicates with the user computing device 102 according to a client-server relationship. For example, the topological basemodel 140 can be implemented by the server computing system 140 as a portion of a web service. Thus, a topological basemodel 122 can be stored and implemented at the user computing device 102 and/or a topological basemodel 140 can be stored and implemented at the server computing system 130. Since, in some implementations, the topological basemodel can be segmented into features that include a graph (e.g., a baselayer) and one or more property layers, each of the features may be individually accessed and/or transmitted between the user computing device 102 and the server computing system 130. Alternatively, for certain implementations, the topological basemodel may not be segmented. For instance, in some implementations the topological basemodel 122 may not be segmented into individual features to preserve indexing and or other relationships.

The user computing device 102 can also include one or more user input component 124 that receives user input. For example, the user input component 124 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include a topological model 140. In some instances, the server computing system 130 can also include a conflation system 142 that in some instances may include various trained machine-learned models. Example machine-learned models include neural networks or other multi-layer non-linear models. Example neural networks include feed forward neural networks, deep neural networks, recurrent neural networks, and convolutional neural networks. In an example implementation, the conflation system 142 may be used to identify correspondences between external (i.e., $3^{rd}$ party) mapping data and data included in the topological basemodel 140. In this manner, the conflation system 142 can be used at least in part to generate instructions for merging and/or updating the topological basemodel 140 based on the $3^{rd}$ party data. For instance, an example implementation can include obtaining a geographic dataset that includes a graph representation comprising a number of edges and vertices for representing a real-world item in a geographic area such as traffic report near an off-ramp. The conflation system 142 can identify a particular stable identifier included in the topological basemodel based at least in part on information included in the geographic dataset such as proximate road identifiers (e.g., road names, exit number, or other related information). Further in some cases, the geographic dataset may share stable identifiers included in the topological basemodel through an API or other application that can allow the geographic dataset to generate an anchor corresponding to the particular real-world item. In some instances, the geographic dataset may then be used to update the topological basemodel to include the anchor based on the identification of a particular edge, and/or generation of a parametric location along the edge.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the conflation system 142 or may be configured to access the topological basemodel 140 from the server computing system 130 rather than obtaining a topological basemodel 122 on the user computing device 102.

Example Model Attributes

Figure 4A:
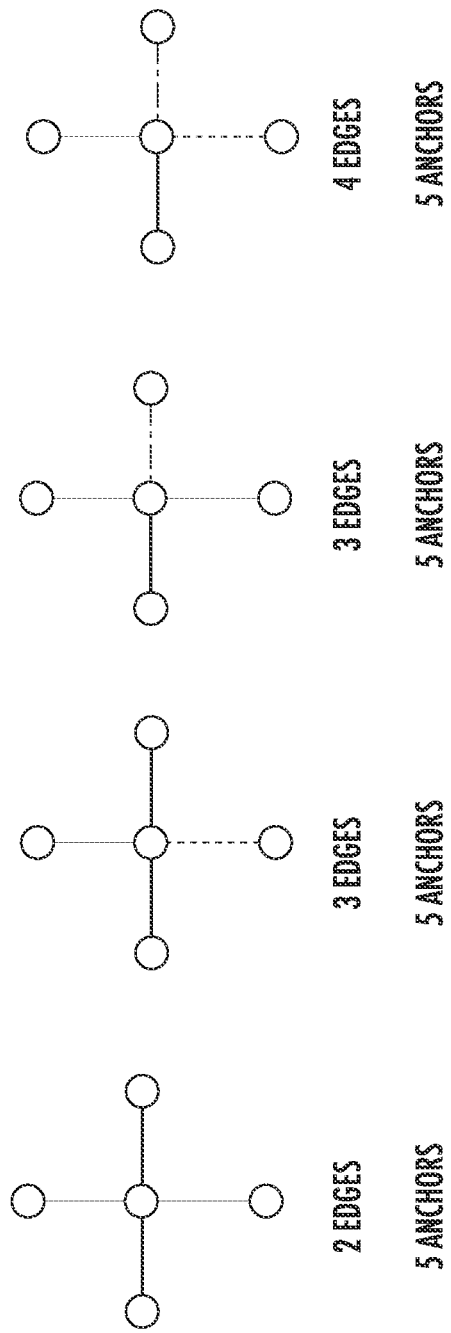
FIG. 4A illustrates an example representation of graph attributes displaying edges (represented as line segments) and anchors (represented as circles) according to the present disclosure.
Figure 4B:
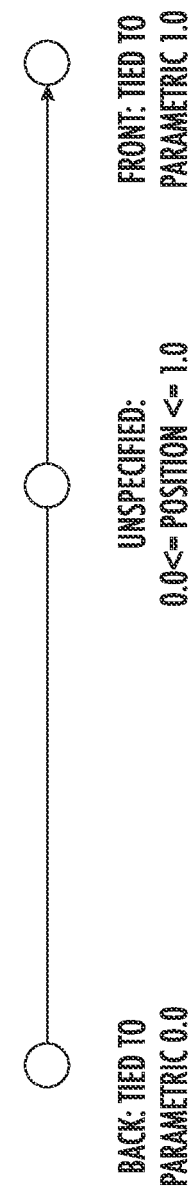
FIG. 4B illustrates an example representation of parametric position which can be associated with anchors in accordance with example embodiments of the present disclosure.
Figure 5A:
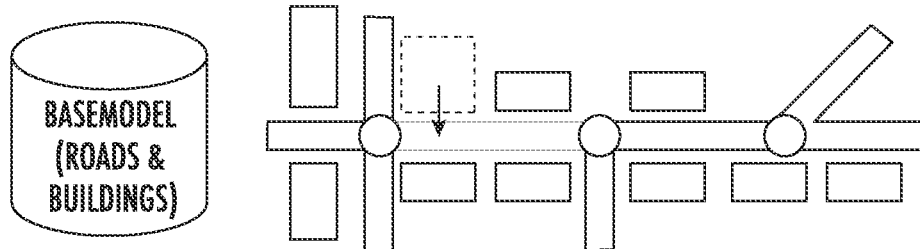
FIGS. 5A-5D illustrate aspects of a topological basemodel representation in accordance with the present disclosure.
Figure 5B:
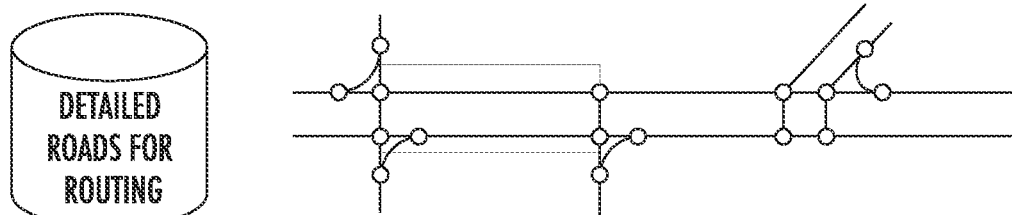
Figure 5C:
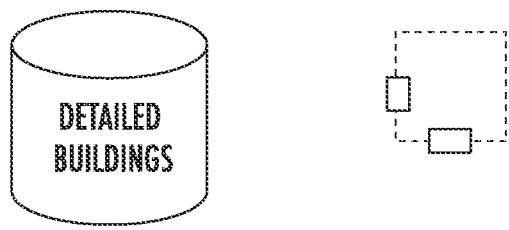
Figure 5D:
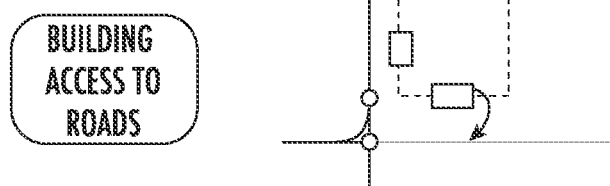

FIGS. 4A and 4B depicts illustrations of aspects of the topological basemodel. These illustrations are provided as examples for practicing implementations as disclosed herein and are not intended to limit aspects only to what is shown. For instance, FIG. 4A depicts illustrations of how edges and anchors may define a path network such as an intersection. In each illustration, 5 anchors are depicted as circles and edges are depicted as lines. Each edge is not constrained to only link two anchors and so unique edges are depicted using differing line widths and/or dashes. Of note, in the rightmost image, each edge shown is only liked to two anchors, illustrating one example of how a normalized representation can be produced by "cutting" each edge at any anchor position. FIG. 4B illustrates another aspect of the present disclosure. While displayed using a parametric definition to indicate relative position, it should be noted that any method for generating a relative position may be used for implementations of the present disclosure. For example, locations along an edge that may be tied to features such as intersections, building faces, or other such information need not be specified or tied to an exact coordinate location. Instead, a parametric location can be defined based on defining a back end and a front end. Further, in some cases, the location need not be specified which may provide advantages when exact location information (e.g., information obtained from a $3^{rd}$ party) is not well defined but may still be represented as affecting a region along an edge.

Example Model Arrangements

FIGS. 5A-5D depict an example arrangement of the topological basemodel. As shown, FIG. 5A displays a basemodel representation displaying anchors as circles and edges as line segments. In some implementations, FIGS. 5B-5D may be included as one or more property layers that include attributes referenced to features of the basemodel depicted in FIG. 5A. For example, FIG. 5B displays further detail for roads including geometry and lanes, FIG. 5C displays further detail for buildings such as entrances and/or exits, and FIG. 5D displays the relation of building detail to road detail. For certain implementations, these property layers can be included as part of the topological basemodel. In other implementations, some or all of the detailed information displayed in FIGS. 5B-5D may be included as part of external (e.g., 3r d party) datasets. This information can be conflated with the basemodel displayed in FIG. 5A to update the basemodel or associated property layers.

Figure 6:
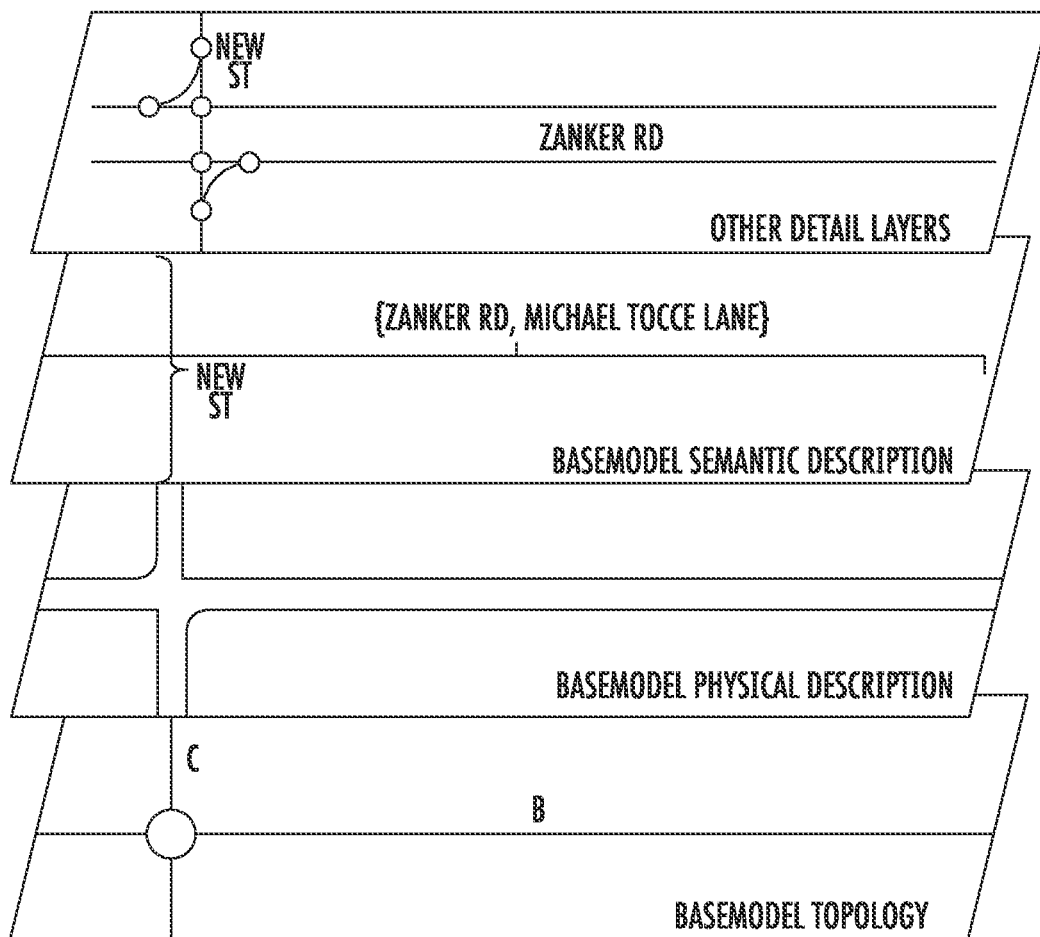
FIG. 6 illustrates an example representation of a hierarchical order of the basemodel according to the present disclosure.

FIG. 6 depicts another example arrangement for the topological basemodel representing a hierarchical structure. As shown, FIG. 6 includes a basemodel topology supporting a physical description, a semantic description, and in some cases further detail layers. Along with the individual layers, an illustration is provided of an intersection between two streets. Using this hierarchical representation allows information to be projected on the basemodel topology without the need to keep track of individual attributes that may be more likely to change over time. In some implementations, attributes of a higher layer may only reference attributes of a lower layer. For instance, attributes of semantic description or physical descriptions may reference the basemodel topology; however, the opposite is not true.

Example aspects of the basemodel topology can include anchoring of all other layers to a common ID space. Thus the topology generally contains a common graph for representing real-world locations or items of interest using an edge, vertex, anchor representation. Example aspects of the physical layer can include shapes described with latitude, longitude, and/or elevations that can be referenced to a datum (e.g., WGS84 or other suitable coordinate systems). Elements of the physical layer can include polygons or polylines with width or a width function (ribbons). Physical elements may be accessed as descriptive elements of edges within the common topology. In some cases, the physical layer can be derived by tracing the shapes of roads from imagery, with shapes ending at the natural boundaries of roads or road elements, such as at the edge of pavement.

Figure 8A:
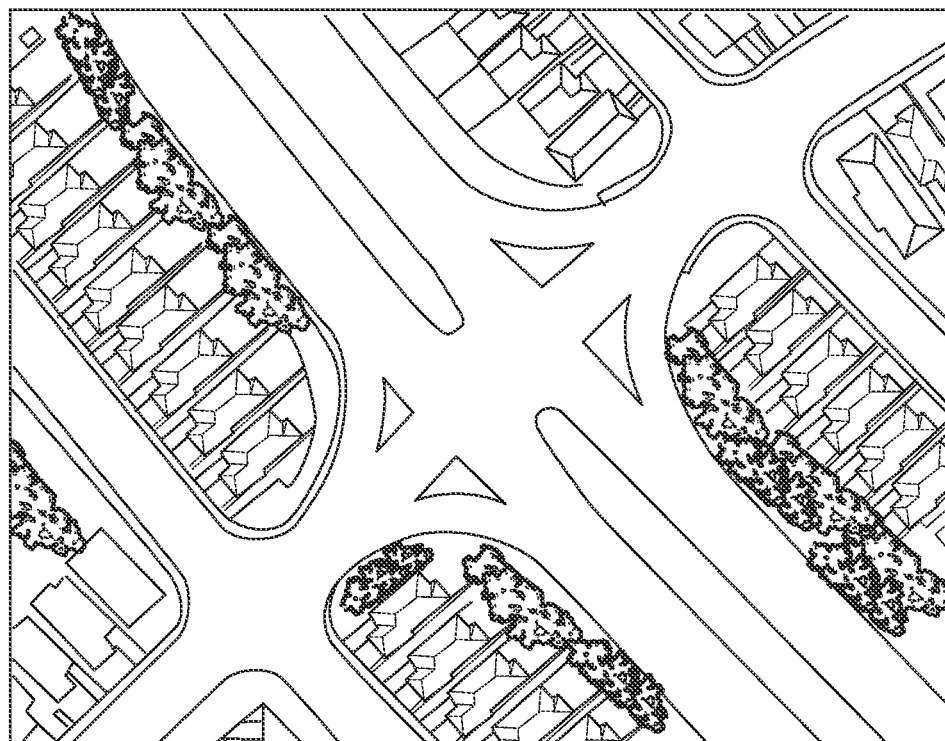
FIG. 8A illustrates example map data that can be used to generate a topological basemodel or property layer elements of a basemodel.
Figure 8B:
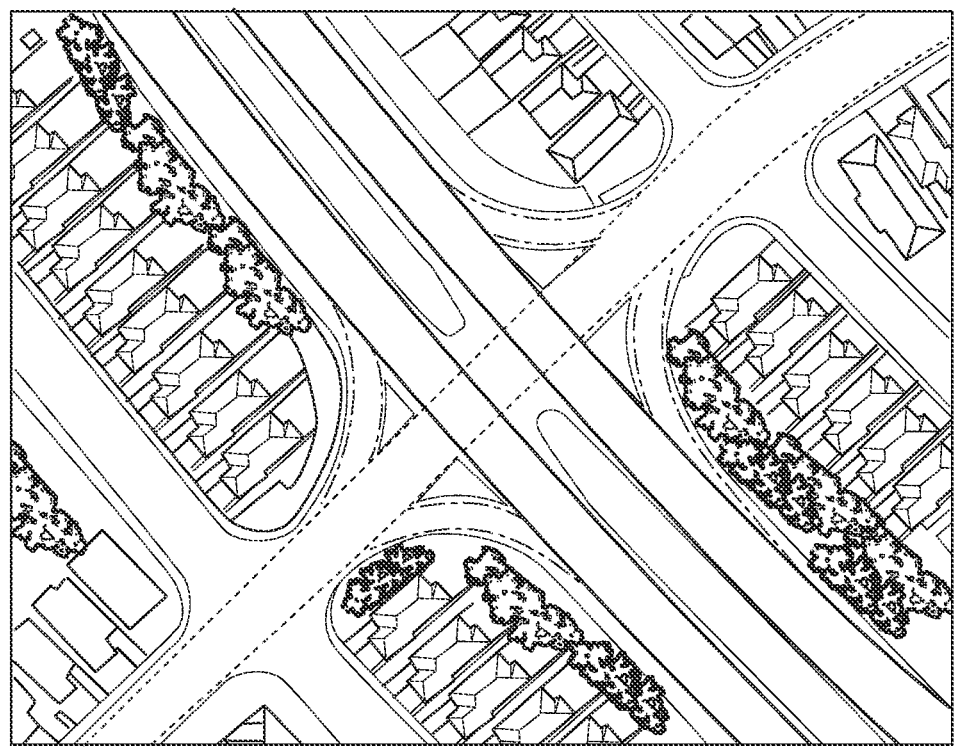
FIG. 8B illustrates an example geometric representation of the road network shown in FIG. 8A in accordance with example embodiments of the present disclosure.
Figure 8C:
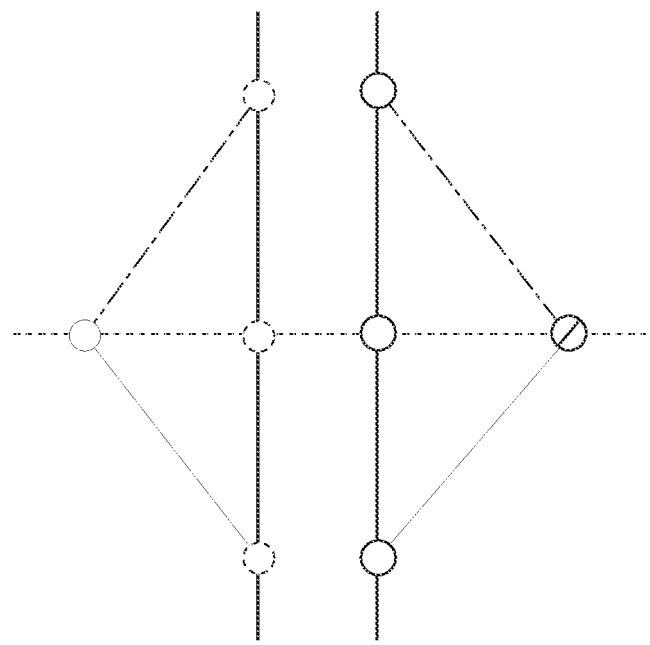
FIG. 8C illustrates an example topological representation of the road network shown in FIG. 8A in accordance with example embodiments of the present disclosure.
Figure 8D:
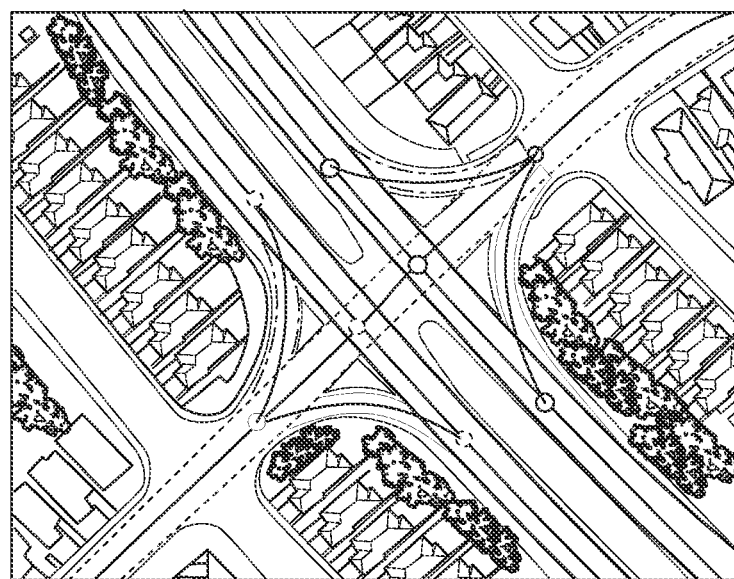
FIG. 8D illustrates the example topological representation in FIG. 8C overlaid with the map data shown in FIG. 8A.

Source imagery may also be collected from aerial sources or ground collection aligned to a globally aligned aerial-seeded 3D mesh. An example of deriving physical properties from aerial imagery is displayed in FIGS. 8A and 8B which display aerial imagery of an intersection (8A) along with an overlay of lines (8B) to in part define aspects of the roads that make up the intersection (e.g., width, curvature, intersection points, etc.) FIGS. 8C and 8D illustrate images displaying one example of how the aerial information may be transformed into a topological representation (e.g., a graph of edges, anchors, and/or vertices) as shown in FIG. 8C. Further this representation can be projected on mapping imagery as shown in FIG. 8D for use in applications such as route generation in navigation.

Example Model Applications

Figure 7:
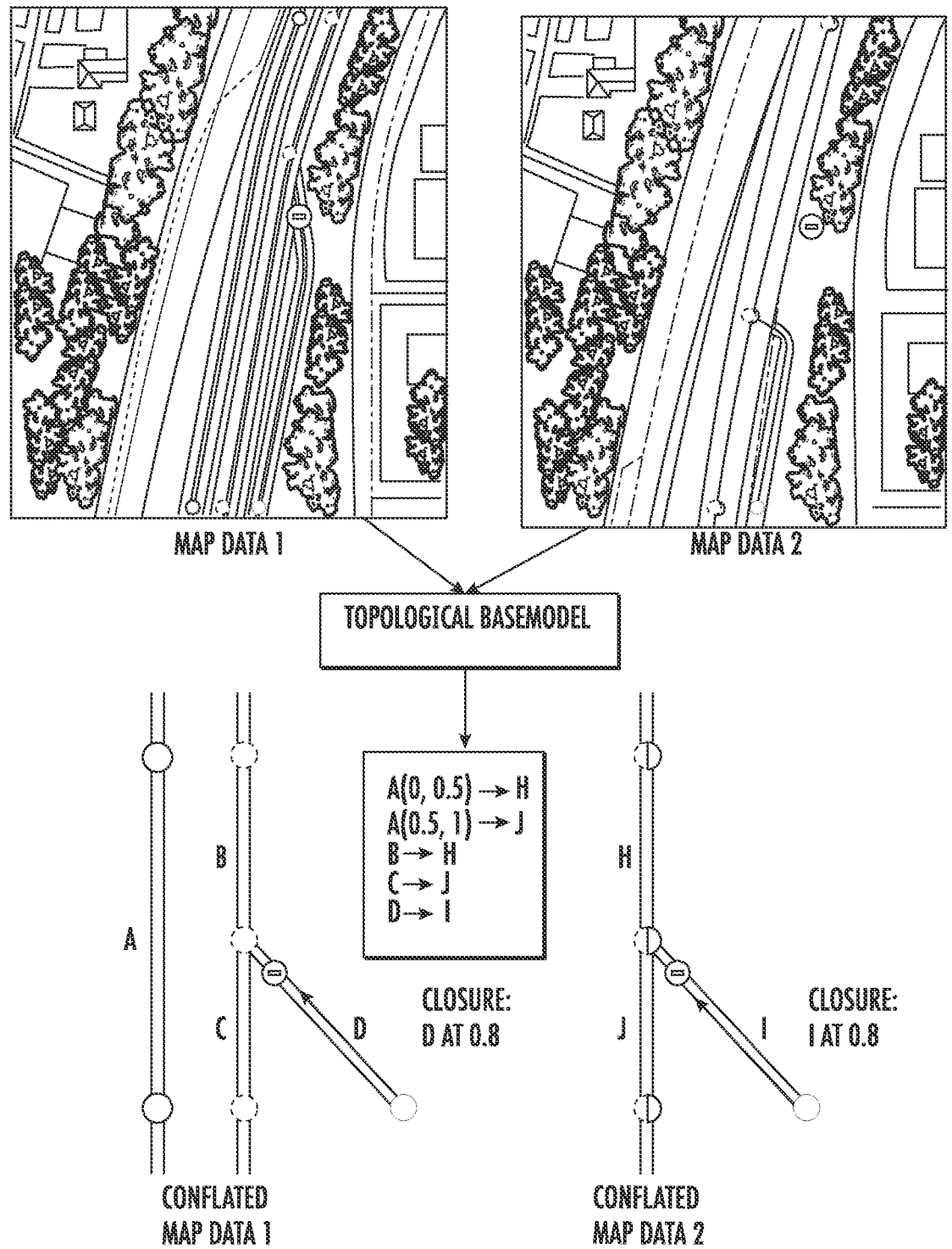
FIG. 7 illustrates an example implementation of a topological basemodel for conflating two disparate mapping datasets. Both datasets can be provided to a topological basemodel in accordance with the present disclosure to produce a mapping between the datasets.

FIG. 7 depicts an example conflation operation for mapping geographic data from a first dataset and a second dataset using an example topological basemodel. As shown, map data 1 and map data 2 represent imagery of the same location. To identify correspondences between the two different representations of the same path network, a correspondent topological map can be generated using an example basemodel. For example, map data 1 may model the highway as two segments, while map data 2 displays only one segment. Other differences can include the location of the merge or "on-ramp". Due to the varying geometry in these representations, pure geometric conflation can produce serious errors (e.g., as shown by the closure marker from map data 1 not being located on the on-ramp in map data 2 when pure geometric conflation is used). Instead, mapping each dataset to a common representation such as a topological basemodel according to the present disclosure can be used to link the disparate topologies by producing a mapping between road segments or modifying join points using anchors to indicate relative position rather than exact position. For example, by using the shared topological basemodel, the closure marker can be placed onto the on-ramp in conflated map data 2.

As another example embodiment for the purpose of illustration, FIG. 7 can be applied to demonstrate a computing system according to the present disclosure including data storing a topological basemodel as well as instructions for determining a correspondence between features in two datasets (e.g., map data 1 and map data 2). The two map datasets can be obtained from a variety of sources including from external 3r d parties. The map data may include features such as street names, road geometry, or other aspects that can be used to look up (e.g., using database operations or other queries) or otherwise determine a common reference and/or underlying representation using the topological basemodel. Here the common reference and/or underlying representation is depicted as conflated map data 1 and conflated map data 2 which can be generated based on map data 1 and map data 2, respectively. However, this is not meant to limit the different types of representations that are possible. Other representations of path segments and other features depicted in the map data can be produced and may depend on the level of detail provided in the map datasets. Once a common reference has been generated, one or more correspondences can be determined between the datasets as shown by the relationships: A(0,0.5)→H, A(0.5, 1)→J, etc. While the figure only illustrates relationships between edge segments, it should be understood that relationships between the vertices (depicted here as circles or semi-circles) may also be generated based at least in part on the common reference to stable identifiers in the shared topological basemodel. In some cases, this common reference can be used to transfer information between map datasets, such as by generating a new feature (e.g., an anchor, an edge, or a vertex) in one of the datasets. For instance, if map data 2 were to lack the closure denoted as a circled dash '-'. The relationship of D→I may be used to map the closure of D at 0.8 to I at 0.8. Thus a new feature can be generated as part of map data 2 or conflated map data 2 to represent the closure (e.g., such as generating an anchor at the location).

Example Methods

Figure 2:
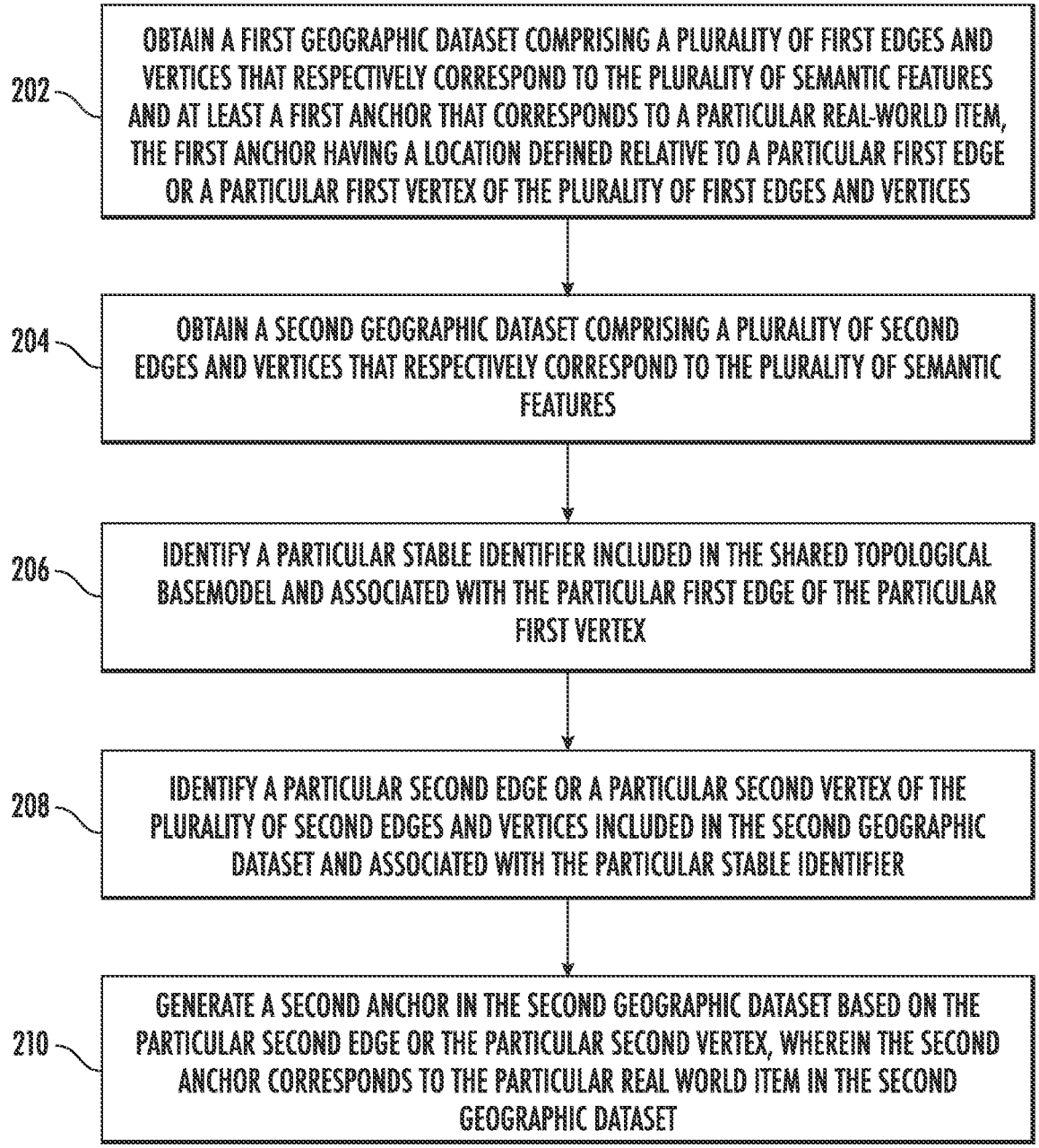
FIG. 2 illustrates an example process flow diagram including an example method for conflating two geographic datasets, at least one of which is associated with a topological basemodel in accordance with the present disclosure.

FIG. 2 depicts a flow chart diagram of an example method to perform conflation according to example embodiments of the present disclosure. Although FIG. 2 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 202, a computing system can obtain a first geographic dataset comprising a plurality of first edges and vertices that respectively correspond to the plurality of semantic features and at least a first anchor that corresponds to a particular real-world item, the first anchor having a location defined relative to a particular first edge or a particular first vertex of the plurality of first edges and vertices. Obtaining the first geographic dataset can include accessing a library or library of stored data, generating or modifying geographic data such as aerial information by overlaying sensor information with physical representations, or receiving a data (e.g., from a $3^{rd}$ party).

At 204, the computing system can obtain a second geographic dataset comprising a plurality of second edges and vertices that respectively correspond to the plurality of semantic features. In general, obtaining the second geographic dataset may occur in various manners including but not limited to the examples provided for obtaining the first geographic dataset.

At 206, the computing system can identify a particular stable identifier included in the shared topological basemodel and associated with the particular first edge or the particular first vertex. As an example, identifying the particular stable identifier may include a table lookup that may be performed using a traditional database query (e.g., using SQL), a cloud database query, or other search method for accessing reference ID information.

At 208, the computing system can identify a particular second edge or a particular second vertex of the plurality of second edges and vertices included in the second geographic dataset and associated with the particular stable identifier. One aspect of identifying the particular second edge includes creating a common reference for conflation. By identifying the second edge or vertex based on association with the particular stable identifier that is also associated with the first edge or vertex, the conflation operation can reduce errors in joining data or mapping attributes to a new dataset.

At 210, the computing system can generate a second anchor in the second geographic dataset based on the particular second edge or the particular second vertex, the second anchor corresponding to the particular real-world item in the second geographic dataset. As described above, by utilizing a common reference point, additional reference features may be added to one or both datasets. Though illustrated in this example as generating a second anchor in the second geographic dataset, it should be understood that other graph elements such as edges may be generated and added to the second dataset and/or a shared reference such as a topological basemodel that can be referenced or otherwise accessed (e.g., for additional conflation operations) by the first geographic dataset as well as the second geographic dataset.

From at least the combination of operations described in FIG. 2, two datasets which have associations to a topological basemodel including stable identifiers to reference real-world items using a graph representation can be used to generate shareable information such as an anchor in the second dataset. Further, in some user cases, the first and second geographic dataset may not intrinsically include the stable reference, and instead one or both datasets may need to acquire such information by conflation with an example topological base map according to aspects of the present disclosure. For example, obtaining the first geographic dataset comprising plurality of first edges and vertices that respectively correspond to the plurality of semantic features and at least a first anchor that corresponds to a particular real-world item, the first anchor having a location defined relative to a particular first edge or a particular first vertex of the plurality of first edges and vertices may first include obtaining a geographic dataset. The geographic dataset can then be conflated with a topological basemodel in accordance with the present disclosure.

As an example, conflating the geographic dataset may include accessing a mapping included in or associated with the second geographic dataset that maps the plurality of second edges and second vertices to the plurality of canonical edges and canonical vertices and performing a lookup operation on the mapping to identify the particular second edge or the particular second vertex based on the particular stable identifier.

As another example, identifying the particular second edge or the particular second vertex of the plurality of second edges and second vertices can include: obtaining one or more descriptors included in the second geographic dataset, the one or more descriptors providing information such as: a latitude, a longitude, an altitude, a street name, or combinations thereof. The one or more descriptors can be compared to an example basemodel, for example by comparing the one or more descriptors to at least one of the attributes included a property layer of the basemodel. Based at least in part on the comparison, a closest attributed may be determined (e.g., an attribute matching one or more descriptors such as a street name). As a result, the anchor, vertex, or both to which the closest attribute is indexed can be identified. In some implementations the anchor, vertex, or both to which the closest attribute is indexed may be used at least in part to add a plurality of edges and vertices to the second dataset which correspond to the plurality of semantic features included in the first geographic dataset.

Figure 3:
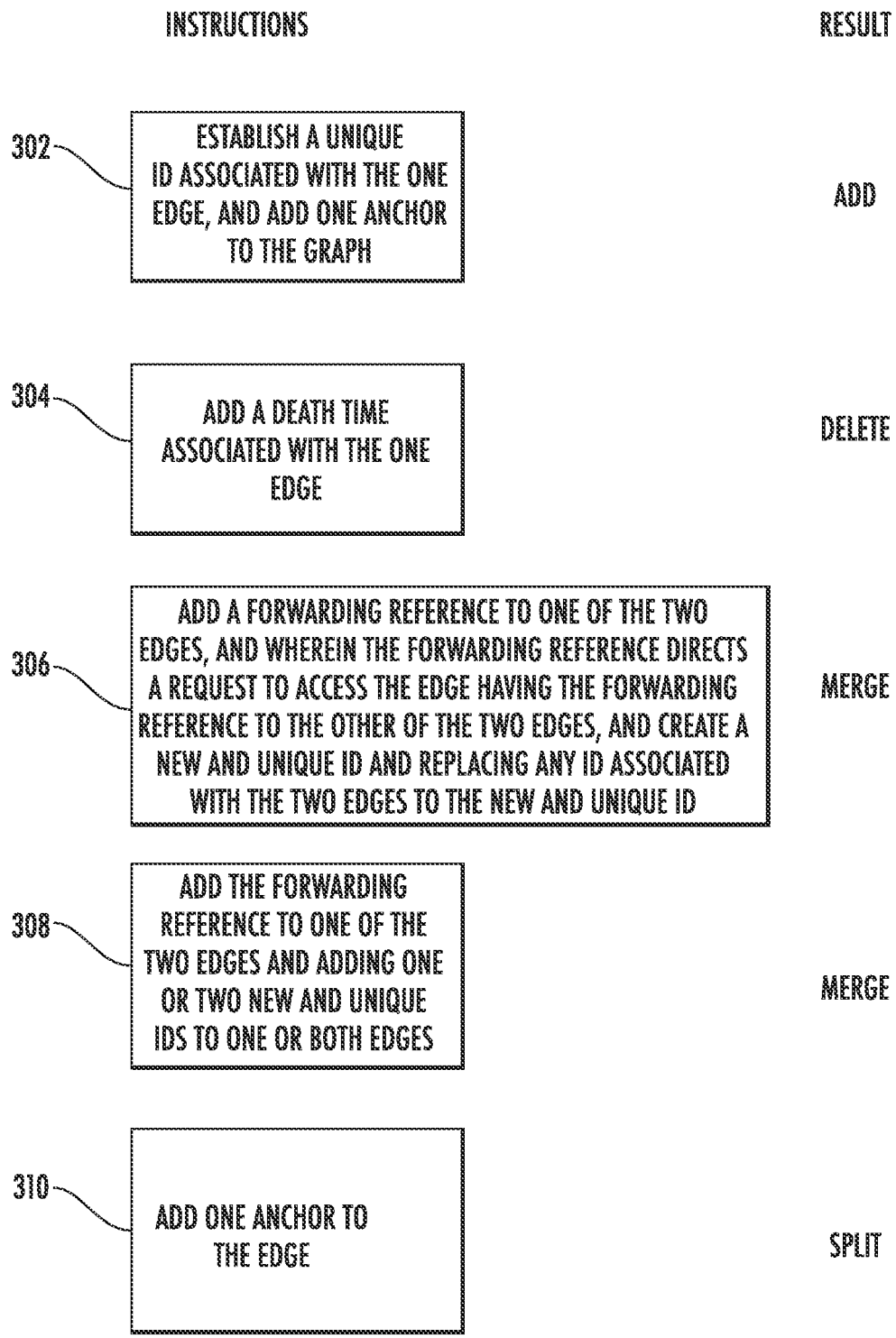
FIG. 3 illustrates example edge operations including computer implemented instructions and the result.

FIG. 3 depicts example operations providing methods for updating the topological basemodel at the graph level. In the figure edge operations 300 are shown as the computer implemented instructions and the result. At 302, the computing system can establish a unique ID associated with the one edge to be added and may further add one anchor to the graph to describe the connectivity of the new edge. At 304, the computing system can add a death time associated with the one edge to delete the edge from the graph. To allow for stability, reference to the edge may not be completely deleted, and instead a time indicator can be established to track a lifespan or epoch during which the edge was active. At 306, the computing system can add a forwarding reference to one of the two edges, the forwarding reference directing a request to access the edge having the forwarding reference to the other of the two edges to merge the two edges. Other example merge operations are shown at 308 and 310. At 310, the computing system can split (e.g., divide) an edge into segments by adding one or more anchors to the edge.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more non-transitory computer-readable media configured to store data and instructions, the data including a shared topological basemodel that comprises a plurality of stable identifiers respectively for a plurality of canonical graph elements that correspond to a plurality of semantic features included in a geographic area; and
one or more processors configured to execute the instructions to perform operations, the operations comprising:
determining, based at least in part on a common reference to one of the plurality of stable identifiers in the shared topological basemodel, a correspondence between a first graph element among a first plurality of graph elements included in a first geographic dataset and a second graph element among a second plurality of graph elements included in a second geographic dataset, different from the first geographic dataset, wherein the first graph element and second graph element correspond to a same semantic feature among the plurality of semantic features,
identifying a third graph element from among the first plurality of graph elements which lacks a corresponding graph element among the second plurality of graph elements,
in response to identifying the third graph element, generating a fourth graph element which corresponds to the third graph element based on the correspondence between the first graph element and the second graph element, the fourth graph element being provided with a location defined relative to the second graph element, and
adding the fourth graph element to the second geographic dataset to update the second geographic dataset.

2. The computing system of claim 1, wherein the first plurality of graph elements include one or more edges, vertices, or anchors.

3. The computing system of claim 1, wherein the operations further comprise associating the third graph element and the fourth graph element with one of the stable identifiers.

4. The computing system of claim 1, wherein
the data further includes at least one property layer comprising one or more attributes for one or more of the plurality of semantic features, and
each of the one or more attributes is indexed to corresponding canonical graph elements among the plurality of canonical graph elements.

5. The computing system of claim 4, wherein the shared topological basemodel does not include references to the one or more attributes of the at least one property layer.

6. The computing system of claim 4, wherein determining, based at least in part on the common reference to the one of the stable identifiers in the shared topological basemodel, the correspondence between the first graph element among the first plurality of graph elements included in the first geographic dataset and the second graph element among the second plurality of graph elements included in the second geographic dataset comprises:
obtaining one or more descriptors included in the second geographic dataset, wherein the one or more descriptors comprises: a latitude, a longitude, an altitude, a street name, or a combination thereof;
comparing the one or more descriptors to at least one of the attributes included the property layer;
determining, based at least in part on the comparing, a closest attribute; and
determining, a canonical graph element from among the plurality of canonical graph elements to which the closest attribute is indexed.

7. The computing system of claim 1, wherein determining, based at least in part on the common reference to the one of the stable identifiers in the shared topological basemodel, the correspondence between the first graph element among the first plurality of graph elements included in the first geographic dataset and the second graph element among the second plurality of graph elements included in the second geographic dataset comprises:
accessing a mapping included in or associated with the second geographic dataset that maps the second plurality of graph elements to the plurality of canonical graph elements; and
performing a lookup operation on the mapping to identify the second graph element based on the one of the stable identifiers.

8. A computing system, comprising:
one or more non-transitory computer-readable media configured to store instructions and to store data, the data including:
a topological basemodel comprising a graph including a plurality of graph elements, the plurality of graph elements including one or more anchors, one or more vertices, or one or more edges, and
at least one property layer comprising one or more attributes, wherein each of the one or more attributes is indexed to one or more of the plurality of graph elements; and
one or more processors configured to execute the instructions to perform operations, the operations comprising:
updating the topological basemodel at a graph level by:
associating a death time with a first graph element from among the plurality of graph elements, and
deleting the first graph element according to the death time associated with the first graph element.

9. The computing system of claim 8, wherein the graph is denormalized.

10. The computing system of claim 8, wherein
the plurality of graph elements include a second graph element, and
the operations further comprise establishing a time indicator to track a duration of time during which the second graph element is active.

11. The computing system of claim 8, wherein the operations further comprise adding a second graph element corresponding to an edge to the graph, and wherein adding the second graph element to the graph comprises:
establishing a unique ID associated with the second graph element; and
adding a third graph element corresponding to an anchor to the graph to relate the third graph element to an existing graph element from among the plurality of graph elements.

12. The computing system of claim 8, wherein
the topological basemodel comprises a plurality of stable identifiers respectively for the plurality of graph elements that correspond to a plurality of semantic features included in a geographic area, and
the operations further comprise:
determining, based at least in part on a common reference to one of the plurality of stable identifiers in the topological basemodel, a correspondence between a first graph element among a first plurality of graph elements included in a first geographic dataset and a second graph element among a second plurality of graph elements included in a second geographic dataset, different from the first geographic dataset, wherein the first graph element and second graph element correspond to a same semantic feature among the plurality of semantic features,
identifying a third graph element from among the first plurality of graph elements which lacks a corresponding graph element among the second plurality of graph elements,
in response to identifying the third graph element, generating a fourth graph element which corresponds to the third graph element based on the correspondence between the first graph element and the second graph element, the fourth graph element being provided with a location defined relative to the second graph element, and
adding the fourth graph element to the second geographic dataset to update the second geographic dataset.

13. The computing system of claim 8, wherein
the plurality of graph elements include a first edge and a second edge, and
the operations further comprise merging the first edge and the second edge by:
adding a forwarding reference to the first edge, and wherein the forwarding reference directs a request to access the first edge having the forwarding reference to the second edge,
creating a new and unique ID and replacing any ID associated with the first edge and the second edge to the new and unique ID, or
adding the forwarding reference to the first edge and adding one or two new and unique IDs to at least one of the first edge or the second edge.

14. The computing system of claim 8, wherein
the plurality of graph elements include a first edge, and the operations further comprise splitting the first edge into one or more new edges by adding an anchor to the first edge.

15. The computing system of claim 8, wherein
the plurality of graph elements include one or more anchors and one or more edges, and
each of the one or more anchors comprises a direction of movement along a corresponding edge among the one or more edges which is linked to the anchor.

16. The computing system of claim 8, wherein the at least one property layer includes information related to a geometric parcel that references one of the plurality of graph elements included in the graph.

17. The computing system of claim 8, wherein
the at least one property layer comprises a plurality of attributes, and
at least one of the plurality of attributes comprises geometry information indexed to one or more graph elements among the plurality of graph elements and description information indexed to one or more graph elements among the plurality of graph elements.

18. A computing system, comprising:
one or more non-transitory computer-readable media configured to store instructions and to store data, a hierarchical database, the hierarchical database including:
a graph including a plurality of graph elements, the plurality of graph elements including one or more anchors, one or more vertices, and one or more edges, wherein each edge, each vertex, and each anchor includes a unique and stable identifier (ID),
a first property layer comprising one or more first attributes, wherein each of the one or more first attributes is indexed to one of the anchors, one of the vertices, one of the edges, or a combination thereof, and
a second property layer comprising one or more second attributes, wherein each of the one or more second attributes is indexed to one of the anchors, one of the vertices, one of the edges, one of the first attributes, or a combination thereof; and
one or more processors configured to execute the instructions to perform operations, the operations comprising:
updating the hierarchical database by:
associating a death time with a first graph element from among the plurality of graph elements, and
deleting the first graph element according to the death time associated with the first graph element.

19. The computing system of claim 18, wherein the operations further comprise adding a second graph element corresponding to an edge to the graph, and wherein adding the second graph element to the graph comprises:
establishing a unique ID associated with the second graph element; and
adding a third graph element corresponding to an anchor to the graph to relate the third graph element to an existing graph element from among the plurality of graph elements.

20. The computing system of claim 18, wherein
the plurality of graph elements include a first edge and a second edge, and
the operations further comprise merging the first edge and the second edge by:
adding a forwarding reference to the first edge, and wherein the forwarding reference directs a request to access the first edge having the forwarding reference to the second edge,
creating a new and unique ID and replacing any ID associated with the first edge and the second edge to the new and unique ID, or
adding the forwarding reference to the first edge and adding one or two new and unique IDs to at least one of the first edge or the second edge.

\* \* \* \* \*